United States Patent [19]
Kemper

[11] 4,435,144
[45] Mar. 6, 1984

[54] APPARATUS FOR SHAPING DOUGH

[76] Inventor: Kate Kemper, Furthstr. 10, CH 8700 Küsnacht-Zürich, Switzerland

[21] Appl. No.: 271,800

[22] Filed: Jun. 8, 1981

[30] Foreign Application Priority Data

Jun. 6, 1980 [DE] Fed. Rep. of Germany ....... 3021329
Mar. 13, 1981 [DE] Fed. Rep. of Germany ....... 3109683

[51] Int. Cl.³ ............................ A21C 7/01; A21C 7/02
[52] U.S. Cl. .................................... 425/332; 425/371; 425/456
[58] Field of Search .............. 425/332, 371, 372, 374, 425/364, 367, 333, 363, 366, 370, 371, 372, 374, 402, 403, 456, 332 A; 426/496, 503, 504, 512

[56] References Cited

U.S. PATENT DOCUMENTS

| 892,559 | 7/1908 | Smith et al. | 425/332 |
| 901,030 | 10/1908 | Overkamp | 425/332 |

FOREIGN PATENT DOCUMENTS

| 230820 | 12/1963 | Austria | 425/332 |
| 2104416 | 8/1972 | Fed. Rep. of Germany | |
| 2281725 | 4/1976 | France | 425/332 |
| 293582 | 3/1971 | U.S.S.R. | 425/372 |

Primary Examiner—Willard E. Hoag
Attorney, Agent, or Firm—Schwartz, Jeffery, Schwaab, Mack, Blumenthal & Koch

[57] ABSTRACT

Apparatus for shaping dough into round loaves including two continuous belts forming a v-shaped trough between them, one of the bands being oscillated in a direction normal to the molding surface.

13 Claims, 5 Drawing Figures

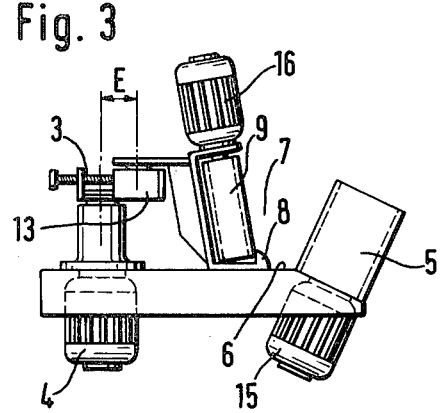
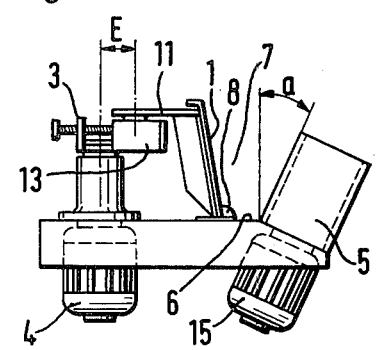
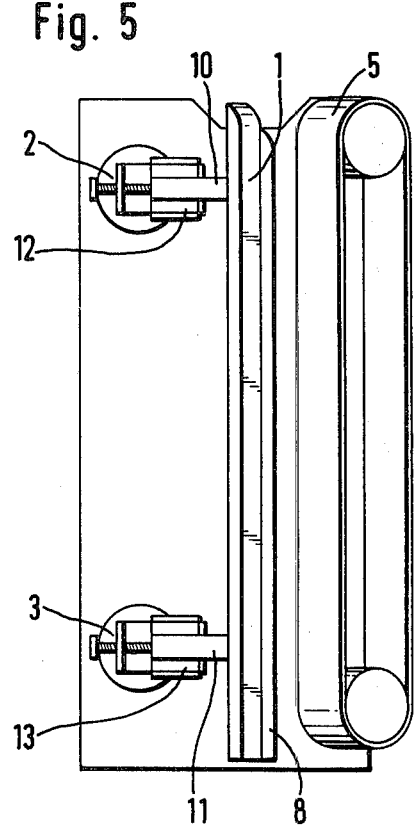

APPARATUS FOR SHAPING DOUGH

The invention relates to an apparatus for the round molding of dough. More particularly, the invention concerns a molding apparatus having a plurality of molding surfaces in the form of endless bands arranged in their cross section approximately in the shape of a V and extending linearly.

As a result of the increasing refinement of eating habits, even small and medium size enterprises in the bakery industry are endeavoring to increase the number of their products with respect to their diversity. This requires the availability of machinery capable of processing both wheat and mixed wheat doughs as well as rye and mixed rye doughs. The processing of such doughs requires a molding procedure. An essential disadvantage of molding machines known heretofore arises from the fact that they are able to work in a satisfactory manner only with a certain type of dough. In the molding procedure, the weighed pieces of dough must be uniformly molded into round or shaped loaves while simultaneously maintaining adequate cohesiveness of the dough. In the process, carbon dioxide escapes from the dough and only a small portion remains in the dough in the form of tiny bubbles. In the case of excessively weak working during molding, larger dioxide bubbles remain in the dough causing an irregular pore structure and the presence of fermentation bubbles in the finished dough. Overly tight working on the other hand results in a cracked surface and longer fermentation times of the processed pieces of dough. As the different types of dough behave differently during the molding process, it is readily understandable that no machines have been developed heretofore capable of satisfactory processing of all of the above-mentioned types of dough, especially in their various mixing proportions. Thus, for example, in the processing of wheat and mixed wheat doughs, so-called conical and cylindrical round molders are used, while for the working of rye and mixed rye doughs, band round molders are employed.

German Pat. No. 915,443 dated June 10, 1954 discloses a molding device belonging to the category of cylindrical round molders. This molding device consists of a shaping channel placed in a circular arc around a stationary axle and formed by a bottom between two mantle surfaces mutually enclosing each other. One of the mantle surfaces rotates together with the bottom as a unit. A plurality of radially measured expansions of the shaping channel cross sections is provide for the purpose of effecting the tumbling of the pieces.

Molding machines of this type are suitable only for the processing of wheat and mixed wheat doughs, because these have a high proportion of gluten. Another disadvantage of this known apparatus results from the fact that it is adjustable to a limited extent only for pices of dough of different size and that such adjustments require a relatively large effort.

An example of a molding machine for large pieces of dough and for the processing of wheat doughs, reference is made to German Pat. No. 819,982 dated Sept. 20, 1951.

The band round molders suitable for rye and mixed rye doughs consist of endless molding bands arranged in their cross sections in the shape of a V. The individual bands may be driven at variable speeds and in different directions. The molding band driven at the higher velocity determines the direction of transport of the pieces of dough through the apparatus.

West German Offenlegungsschrift No. 2 104 416 published Aug. 10, 1972 describes a round molder for dough of a similar design. The apparatus has a trough in the shape of a V formed by two endless molding bands. One lateral cheek of the trough is formed in its lower part only by a pressure bar capable of sliding motion in the direction toward the trough. This measure renders the band round molder suitable for the processing of wheat and mixed wheat dough. It cannot be used for the processing of rye and mixed rye doughs because the particular properties of rye and mixed rye doughs do not tolerate an increased stressing of the surface skin of the loaf. As a result, rye and mixed rye doughs under increased stress crack and tear, additionally leading to the coating of the molding machined.

It is, therefore, an object of the invention to propose an apparatus for the round molding of pieces of dough. The apparatus utilizes the principle of band round molders and is equally suitable for the processing of wheat and mixed wheat and rye and mixed rye doughs. The apparatus is further capable of processing pieces of dough of different sizes with constant quality by means of simple adjustments.

This object is attained according to the invention by an apparatus comprising reversing rolls of an endless band acting as a molding surface and an eccentric means for the generation of circular movements in the direction of the normal to the molding surface, while the lower boundary of said molding surface is abutting against a shaped molding strip following the movement of the eccentric means.

In a further embodiment of the invention, the center line passing through the V-shaped arrangement is inclined to the horizontal by an angle smaller than 90° and larger than 20°. The upper molding band is equipped with a variable drive and is arranged on an adjusting slide displaceable linearly with respect to the molding gap. The slide is provided with an eccentric cam driven by a motor and capable of actuating the molding band.

The range of dough weights that can be processed in the apparatus according to the invention is significantly expanded. The molding quality is also significantly improved.

The aforementioned inclination of the opposing molding surfaces according to the invention makes it possible for the pieces of dough to rest on the lower molding band as the result of the force of gravity while the tightening of the skin of the dough is effected preferably by the upper molding band in opposing movements and with the intensive cooperation of the molding strip. Depending on the type and consistency of the dough, it is necessary that the upper molding band be capable of performing a defined motion both in the direction of the transport movement and perpendicularly to it. The arrangement of the entire molding band, including its eccentric device on a displaceable slide, renders it possible to extensively adjust the available molding space to the weight of the dough to be processed.

Experimental development work has demonstrated that the center line passing through the V-shaped arrangement preferably has an inclination to the horizontal of 40° to 50° and most preferably 45°. The inclination of the molding bands defining the V-shaped molding space to the center line is approximately between 30° and 40°, and preferably 35°. Such a position of the molding bands with respect to each other in space, insures that only an appropriate proportion of the overall force component is directed in the direction of the lower molding gap. This assures gentle processing adaptable to any type of dough, while the smearing of the dough on the bottom of the trough is largely prevented.

In a further embodiment of the invention, the drives of the molding bands and the drive of the eccentric device are reversible. This makes it possible to reverse the direction of motion of each molding band by simple switching. The same is true for the eccentric movements.

It is advantageous to design the reversible motors to be reversible by means of a common reversing switch. This renders it feasible to operate the entire installation in one direction or another. Such a feature is particularly advantageous for installation in a larger facility so that multiple applications are possible without any rebuilding being necessary. In the reversible design the inlet station is interchangeable with the outlet station.

The shaped molding strip is of particular importance for the molding process, as it makes it possible to effect the satisfactory closing of the skin of the dough without producing smearing in the lower boiling space. For this reason, the shaped molding strip is equipped according to the invention, with a convex curvature facing the molding space when viewed in cross section. In a further advantageous embodiment, the shaped molding strip is made of a synthetic plastic material and provided with an antiadhesion coating. Similarly, the base plate defining the molding space in the downward direction and abutting against the shaped molding strip is also provided with an antiadhesion coating. The arrangement prevents the smearing of the dough during processing.

The adjusting slide, upon which both the eccentric device and the upper molding band are located, is advantageously adjustable by means of a manual crank. Larger and remotely operated installations may obviously be equipped with a motor drive by means of a servo motor.

It is particularly advantageous to make all of the drives separately reversible and deenergizable.

Slideways connected with the housing are arranged on both the inlet and the outlet sides whereby the removal and further transportation of the pieces of dough are simplified.

For the processing of the different types of dough, all of the drives are program controlled, so that depending on the nature of the dough to be processed, the appropriate directions of motion and the velocities may be activated maximally and automatically by the actuation of a single switch.

The invention shall be explained in more detail with the aid of drawings, wherein several embodiments are represented.

In the drawings:

FIG. 3 depicts a cross section of an apparatus in simplified form;

FIG. 4 shows a cross section of an apparatus according to another embodiment of the invention, and FIG. 5 illustrates a top view of the embodiment according to FIG. 4.

Figure 1:
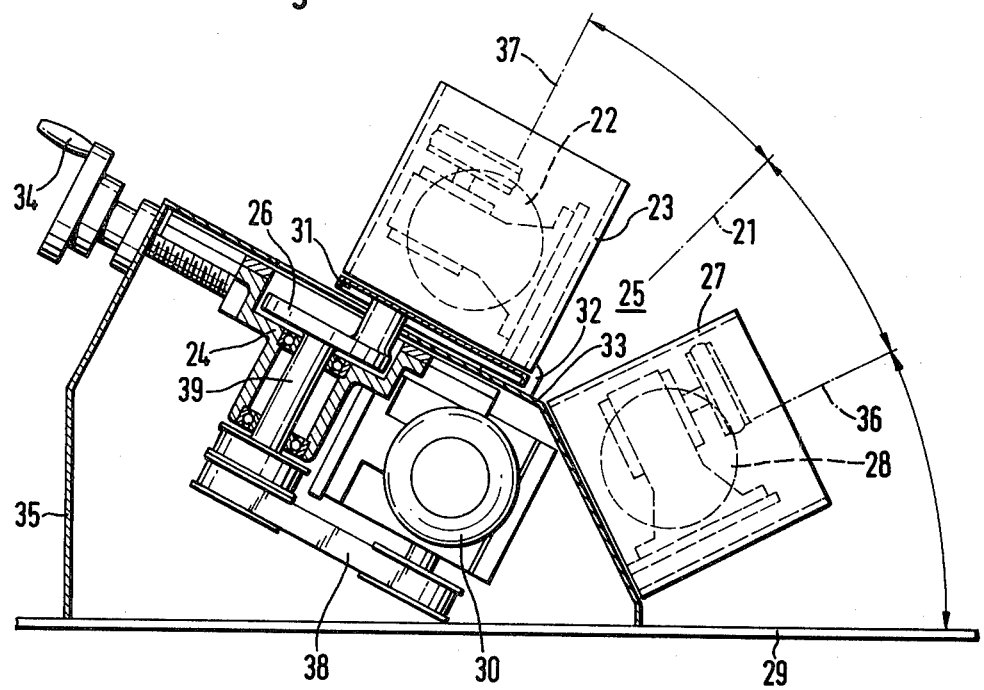
FIG. 1 shows an apparatus for the round molding in a schematic representation and in a cross section.

As shown in FIG. 1, a molding band 27 is located on a housing 35 at an angle of 27° between the horizontal and the center line 36. This molding band is driven separately by a reversible motor 28. A second molding band 23 is arranged at an angle of 35° between the center line 36 of the molding band 27 and the center line 37. This second molding band also has its own independent drive in the form of a reversible motor. The molding band 23 is located on a plate 31 which in turn is fastened to an adjusting slide 24. The adjusting slide may be displaced in the plane of the drawing by means of the manual crank 34 so that thereby the molding gap or molding space 25 may be adjusted for different weights of the dough. An eccentric device 26 with a motor 30 is located on the adjusting slide 24. Motor 30 drives eccentric shaft 39 by mans of drive belt 38. A shaped molding strip 32 abuts against the lower rim of the molding band 23. The strip 32 impacts the base plate 33 of the apparatus and is connected with the plate 31 so that the shaped molding strip 32 follows the adjusting movement of the adjusting slide 24. The shaped molding strip 32 is curved in a convex manner in the direction of the molding gap 25. By means of a suitable choice of velocity and working direction of each of the drives 22, 28 and 30, the molding intensity and the passage of time may be varied and adapted to a given consistency of the dough.

In the processing of wheat doughs, for example, the eccentric drive 30 is operated so that the molding band 23 performs an eccentric motion in the clockwise direction. The motor 22 remains inactive so that the molding band 23 executes only a rotating motion and not a linear motion. The motor 28 is actuated so that the molding band 27 moves in the clockwise direction. The magnitude of the molding gap 25 and, thus the distance of the molding bands 23 and 27 from each other, is adjusted by means of the manual crank 34. This adjustment is a function of the weight of the dough to be processed. By varying the velocity of the motor 28, for example, by means of thyristor controls, the transport velocity of the molding band 27 is determined. Thus, the length of time it takes a piece of dough to move through the molding gap is adjusted as desired.

To process a mixed wheat or a mixed rye dough, the eccentric means, the molding band 23 and the molding band 27 move in the counter clockwise direction. This produces an increased molding intensity and the setting of an appropriate difference in velocity of the bands 23 and 27 determines the direction of transport.

In the processing of rye doughs the eccentric drive remains inactive. The molding gap 25 is adjusted by means of the manual wheel 34 to the weight of the dough to be processed. The molding bands 23 and 27 are both operated in the counter clockwise direction. The velocity of the molding band 23 is higher than that of the band 27, thereby generating a corresponding rolling action in the dough.

FIG. 3 shows a simplified embodiment of the invention. Herein, the endless molding band 9 is driven by the motor 16. The molding strip 8, bordering the molding band 9 in the downward direction and toward the molding gap 7 is connected with the adjusting device 13 and the eccentric means 3. If the apparatus is being used for the molding of wheat and mixed wheat doughs, the motor 16, the molding strip 8 and the molding band 9 are all performing eccentric motions. In such a case, the motor 16 is inactive. The opposing molding band 5 may be moved in one running direction at a velocity different from that of the opposing molding band. In this manner, the resulting molding path may be varied over a wide range in keeping with the portions of dough to be processed. For the processing of wheat and mixed wheat doughs the eccentricity E is adjusted to suit the prevailing dough properties. The drive 4 is actuated so that the molding surface 1 opposing the molding surface 5 performs a circular movement in the horizontal. The angle a of inclination of the molding band 5 is determined in keeping with the size of the pieces of dough. The velocity of the motor 15 is chosen accordingly. As mentioned hereinabove, the length of the molding path may be varied thereby over a long range.

Figure 2:
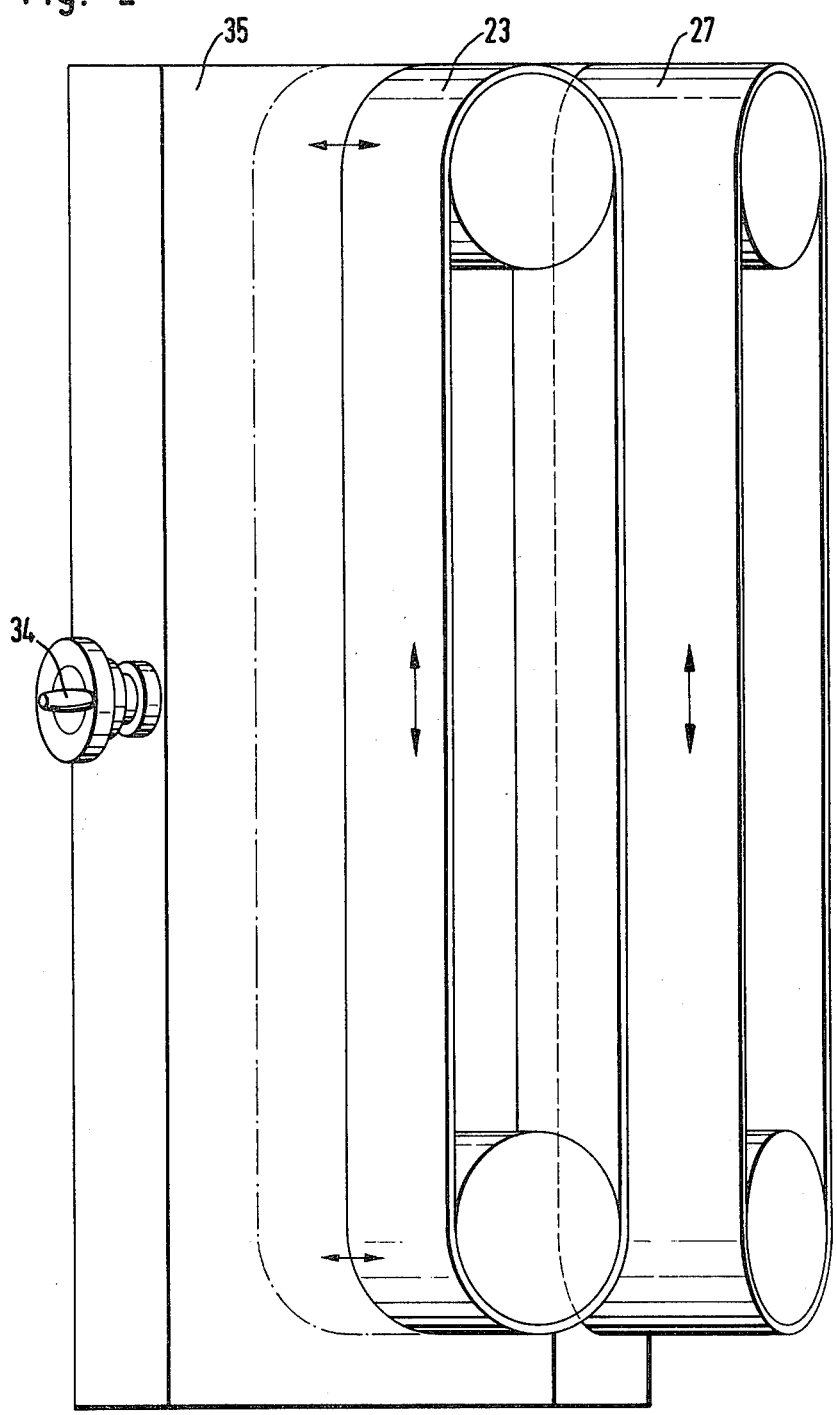
FIG. 2 illustrates a top view of the apparatus of FIG. 1.

FIG. 4 shows an embodiment further simplified in comparison with FIGS. 1 to 3 in that the molding surface 1 is in the form of a molding bar connected frictionally by way of the linkage 10 and 11 and the adjusting devices 12 and 13 and the eccentric devices 2 and 3 and the motor 4. The molding surface 1 is limited in its downward motion by the stationary bottom plate 6 and it is abutting toward the molding space 7 against the shaped molding strip 8 which in turn follows the movement of the molding surface. By means of the adjusting devices 12 and 13, as mentioned hereinabove, the eccentricity E may be varied, thereby altering the slide path in the V-shaped molding space 7. The eccentricity E may also be varied differentially for the adjusting devices 12 and 13, so that the slide path may also be varied over the length of the apparatus. The shaped molding strip 8 preferentially is made of a synthetic plastic material with fluorocarbon resins being particularly suitable. The shaped molding strip applies a stronger force to the lower portions of a piece of dough in the processing of wheat or mixed wheat doughs, thereby generating a tensile stress over the surface of the piece of dough and effecting the closing of said piece of dough. The shaped molding strip 8, therefore, acts on the piece of dough to be processed from below, thereby significantly improving the molding process. As the shaped molding strip 8 is connected with the molding surface 1, it performs all of the motions of said molding surface.

The endless molding band 5 is arranged opposite to the molding surface 1 in an inclined position at an angle a. The inclination of the molding band 5 may be varied in a manner not shown in detail, so that the V-shaped molding space may be adjusted for pieces of dough of different sizes. The molding band 5 is driven by the motor 15. The velocity of the motor 15 is variable continuously in each driving direction.

It is common in the bakery industry to process approximately constant mixtures of wheat and rye flour, whereby it is possible to program the drives. The same is true for the processing of bread and of balls of dough for rolls. It is, therefore, possible to firmly program the apparatus according to the invention and to actuate the program desired by the operation of a few switches. By means of such programming, extensive automation is made feasible so that the apparatus according to the invention is also suitable as a module in larger installations. The apparatus may then be operated in a fully automatic mode. Naturally, the automatic controls may also be deactivated, whereby any velocity or combination of velocities, including the eccentric means, may be effected.

The device according to the invention may thus be used for all types of dough and all of the usual weights, both in small and large operations. The device may be charged both automatically and manually. The machine inlet may be reversed to become the outlet and vice versa, by the simple reversal of the movements therein. This is of particular importance in large scale installations.

I claim:

1. An apparatus for shaping dough comprising:
   a pair of endless band units, each of said band units having a molding surface forming a V-shaped gap for the dough to be shaped;
   rotary means for imparting oscillatory motion to one of said endless band units in the direction normal to the molding surface and said means including a molding band arranged on an adjusting slide displaceable in said direction and a motor driven eccentric device for actuating said molding band and
   a molding strip abutting the molding surface of said endless band unit adapted for said oscillatory motion.

2. The apparatus of claim 1 wherein said molding strip comprises a strip having a convex surface in the direction of said V-shaped gap.

3. The apparatus of claim 1 further comprising means for sliding pieces of dough into and out of said V-shaped gap.

4. The apparatus of claim 1 wherein said molding strip is mounted on an adjusting slide displaceable in the direction of its normal.

5. The apparatus of claim 4 wherein said adjusting slide is displaceable by means of a manual crank.

6. The apparatus of claim 1 wherein each of said endless bands and said eccentric drive means are independently driven by variable, reversible motors.

7. The apparatus of claim 6 wherein said variable, reversible motors are reversible by means of a common reversing switch.

8. The apparatus of claim 6 wherein said variable, reversible motors are reversible by means of separate independent switches.

9. The apparatus of claim 1 wherein said V-shaped gap forms an angle of said V-shape of about 60°–80°.

10. The apparatus of claim 9 wherein said angle is 70°.

11. The apparatus of claim 10, wherein said second angle is between about 40° and about 50°.

12. The apparatus of claim 9 wherein said angle of said V-shape is displaced such that a center line of said angle is inclined toward the horizontal by a second angle smaller than 90° and larger than 20°.

13. The apparatus of claim 12 wherein said second angle is 45°.

* * * * *